United States Patent
Prausse et al.

(10) Patent No.: US 9,322,916 B2
(45) Date of Patent: Apr. 26, 2016

(54) ENVIRONMENT MONITORING DEVICE IN A MOTOR VEHICLE AND METHOD FOR MONITORING THE ENVIRONMENT USING A CORRELATION

(75) Inventors: Claudia Prausse, Braunschweig (DE); Volkmar Tanneberger, Meine (DE); Stephan Max, Gifhorn (DE)

(73) Assignee: VOLKSWAGEN AG, Wolfsburg (DE)

( * ) Notice: Subject to any disclaimer, the term of this patent is extended or adjusted under 35 U.S.C. 154(b) by 288 days.

(21) Appl. No.: 14/119,051

(22) PCT Filed: Apr. 30, 2012

(86) PCT No.: PCT/EP2012/001867
§ 371 (c)(1),
(2), (4) Date: Mar. 5, 2014

(87) PCT Pub. No.: WO2012/159703
PCT Pub. Date: Nov. 29, 2012

(65) Prior Publication Data
US 2014/0198620 A1   Jul. 17, 2014

(30) Foreign Application Priority Data
May 21, 2011   (DE) .......................... 10 2011 102 202

(51) Int. Cl.
*G01S 15/93* (2006.01)
*G01S 7/521* (2006.01)
*G01S 15/32* (2006.01)

(52) U.S. Cl.
CPC ............... *G01S 15/931* (2013.01); *G01S 7/521* (2013.01); *G01S 15/32* (2013.01); *G01S 2015/938* (2013.01)

(58) Field of Classification Search
CPC ....... G01S 7/521; G01S 15/931; G01S 15/32; G01S 2015/938
See application file for complete search history.

(56) References Cited

U.S. PATENT DOCUMENTS

| 2003/0133362 A1* | 7/2003 | Fortuna .................. G01S 7/523 367/100 |
| 2007/0008819 A1* | 1/2007 | Diessner ............. G01S 7/52004 367/99 |

(Continued)

FOREIGN PATENT DOCUMENTS

| DE | 69210584 T2 | 10/1996 |
| DE | 102008016558 A1 | 10/2009 |

(Continued)

OTHER PUBLICATIONS

How Volkswagen Got Away With Diesel Deception; http://www.nytimes.com/interactive/2015/business/international/vw-diesel-emissions-scandal-explained.html?_r=1; Oct. 2015; 1 page.*

(Continued)

*Primary Examiner* — Daniel Pihulic
(74) *Attorney, Agent, or Firm* — Barnes & Thornburg LLP

(57) ABSTRACT

An environment monitoring device in a motor vehicle having a signal generating device for generating a transmitted signal, at least one ultrasonic transducer for converting electric oscillations into acoustic oscillations and/or vice versa, and an evaluation device which evaluates an electric received signal in order to determine distances to objects in an environment of the motor vehicle, wherein the signal generating device is linked to the at least one ultrasonic transducer so that the ultrasonic transducer emits an ultrasonic transmitted signal into the environment in accordance with the electric transmitted signal, and the evaluation device is connected to the at least one ultrasonic transducer or at least one further ultrasonic transducer in order to receive the electric received signal. Also disclosed is a method for monitoring an environment by using a cross-correlation.

11 Claims, 3 Drawing Sheets

(56) References Cited

U.S. PATENT DOCUMENTS

| | | |
|---|---|---|
| 2007/0115102 A1 | 5/2007 | Nakano et al. |
| 2007/0115758 A1 | 5/2007 | Kojima et al. |
| 2009/0135672 A1* | 5/2009 | Matsuura .............. G01S 3/8083 367/100 |
| 2014/0198620 A1* | 7/2014 | Prausse .................. G01S 7/521 367/100 |
| 2014/0369168 A1* | 12/2014 | Max ...................... G01S 15/878 367/93 |

FOREIGN PATENT DOCUMENTS

| | | | |
|---|---|---|---|
| DE | 102009040264 A1 | 3/2011 | |
| DE | WO 2012159703 A1 * | 11/2012 | .............. G01S 7/521 |
| EP | 0797105 A2 | 9/1997 | |
| EP | 1619518 B1 | 12/2009 | |
| WO | 2008125260 A1 | 10/2008 | |

OTHER PUBLICATIONS

Search Report for German Patent Application No. 10 2011 102 202.7; Aug. 23, 2011.
Search Report for International Patent Application No. PCT/EP2012/0001867; Jul. 23, 2012.
Hernandez et al.; Ultrasonic Ranging Sensor Using Simultaneous Emissions from Different Transducers; IEEE Transactions on Ultrasonics, Ferroelectrics, and Frequency Control; Dec. 2004; pp. 1660-1670; vol. 51. No. 12.
Office Action for Chinese Patent Application No. 201280034106.2; Dec. 10, 2014.

* cited by examiner

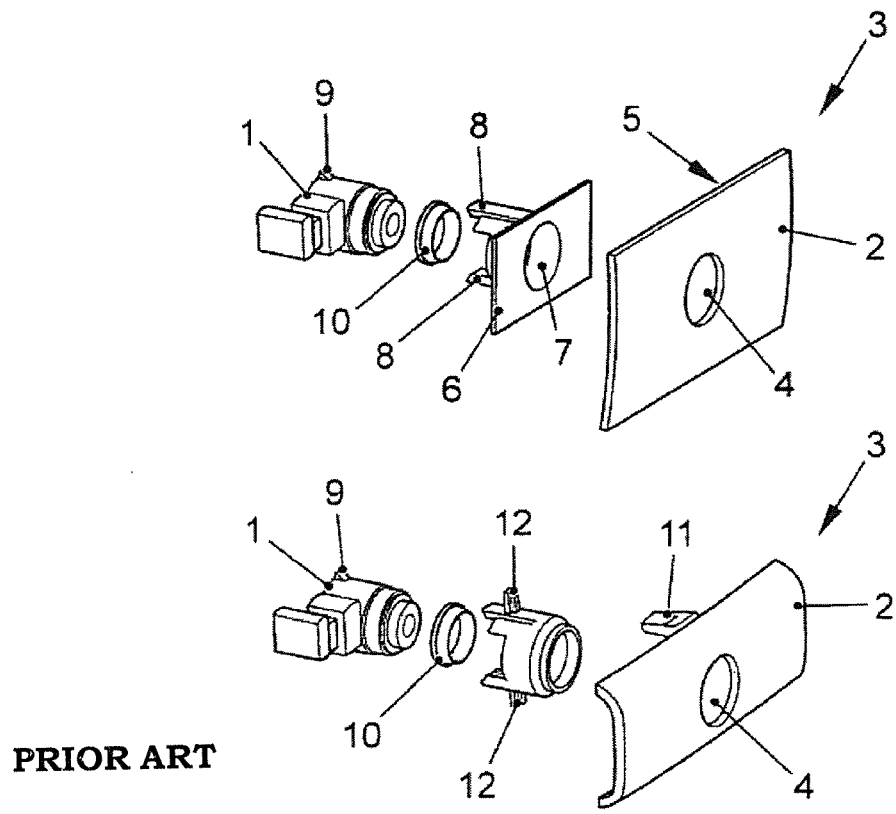
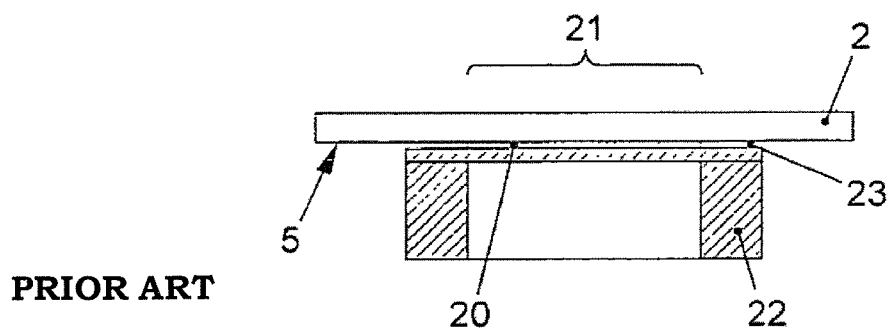

ENVIRONMENT MONITORING DEVICE IN A MOTOR VEHICLE AND METHOD FOR MONITORING THE ENVIRONMENT USING A CORRELATION

PRIORITY CLAIM

This patent application is a U.S. National Phase of International Patent Application No. PCT/EP2012/001867, filed 30 Apr. 2012, which claims priority to German Patent Application No. 10 2011 102 202.7, filed 21 May 2011, the disclosures of which are incorporated herein by reference in their entirety.

SUMMARY

Disclosed embodiments relate to an environment monitoring device and to a method for environment monitoring in a motor vehicle.

BRIEF DESCRIPTION OF THE DRAWINGS

The invention will be explained in greater detail with reference to illustrative embodiments, in which:

FIG. 1 shows a diagrammatic representation of various forms of installation of ultrasonic sensors in bumpers according to the prior art with an installation in recesses in an outer wall of a bumper;

FIG. 2 shows a diagrammatic image of an ultrasonic transducer according to the prior art which is installed concealed in a bumper;

DETAILED DESCRIPTION OF THE DISCLOSED EMBODIMENTS

Figure 3:
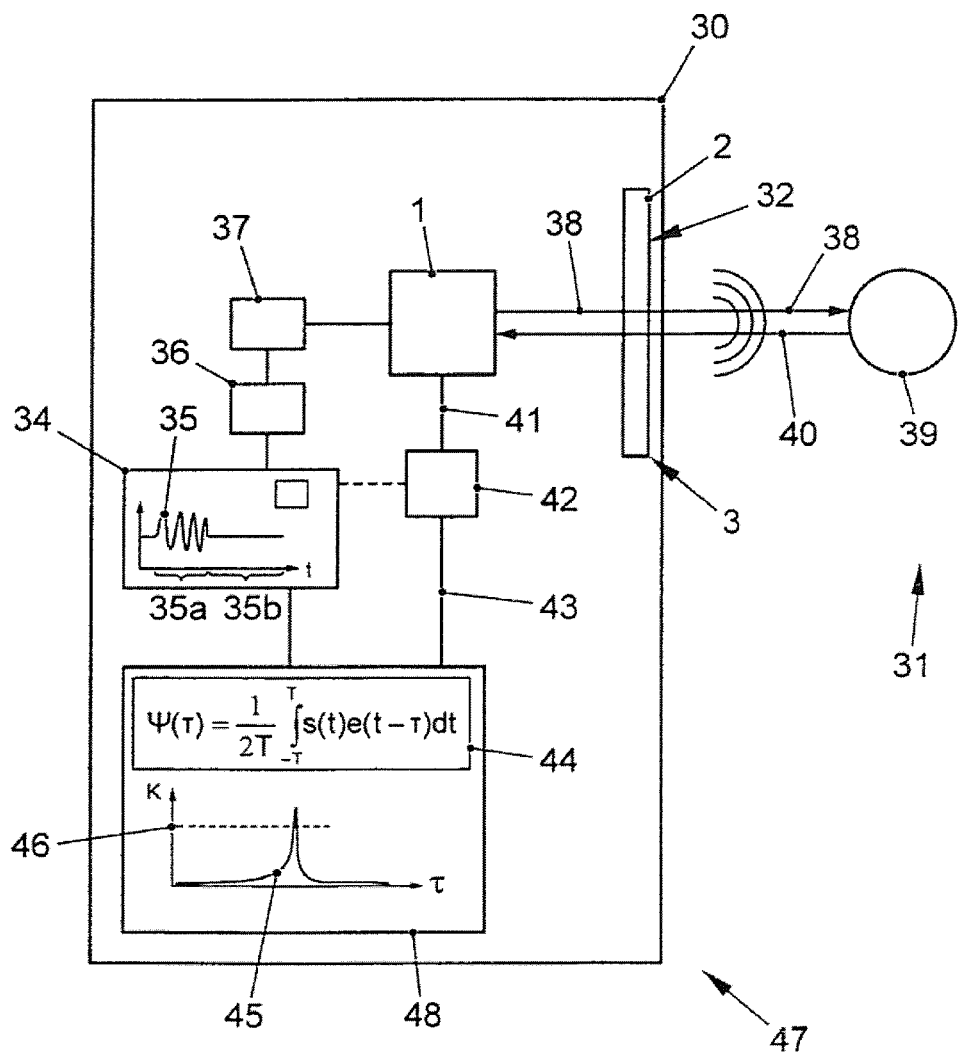
FIG. 3 shows a diagrammatic representation of an environment monitoring device.

Illustrative embodiments provide for environment monitoring for ultrasonic sensors or ultrasonic transducers, respectively, installed in a concealed manner, without increasing the costs and a technical expenditure in the form of technical required components and the design thereof distinctly compared with systems which are used for environment monitoring solutions which are utilized with ultrasonic transmitting and/or receiving devices, installed in an unconcealed manner, in motor vehicles.

Illustrative embodiments are based on the concept of improving and optimizing the signal evaluation. A change of the evaluation of the received echo signals is possible without significant cost expenditure since a change in the electronics can be achieved without or with only low additional costs compared with system which are currently used for evaluation of the echo signals. Otherwise, the same hardware components can be used essentially which are also used for unconcealed installation of the ultrasonic transmitting and receiving devices.

Illustrative embodiments of an environment monitoring device in a motor vehicle comprise a signal generating device for generating a transmitted signal, at least one ultrasonic transducer for converting electric oscillations into acoustic oscillations and/or vice versa, an evaluation device which evaluates a received signal in order to determine one or more distances from objects in an environment of the motor vehicle, wherein the signal generating device is linked to the at least one ultrasonic transducer so that the ultrasonic transducer radiates a transmitted ultrasonic signal into the environment in accordance with the electric transmitted signal and the evaluation device is connected to the at least one ultrasonic transducer or at least one further ultrasonic transducer in order to receive the electric signal which is derived from the reflected transmitted ultrasonic signal (the echo signal) at the at least one ultrasonic transducer or the at least one further ultrasonic transducer, wherein the at least one ultrasonic transducer and, if appropriate, the at least one further ultrasonic transducer are arranged integrally in the vehicle on a side, facing away from the environment, of a chassis component, i.e. a vehicle component, so that between the at least one ultrasonic transducer and, if appropriate, the at least one further ultrasonic transducer and the environment of the motor vehicle to be monitored in each case a closed, physically formed surface of a vehicle component, particularly a wall of a bumper, is arranged and the evaluation unit comprises a correlation unit which forms a cross-correlation of the transmitted signal with the received signal and is also constructed to determine the one or more distances from objects in the environment by means of the correlation signal calculated from the cross-correlation.

Firstly, a transmitted signal is generated respectively in an ultrasonic measuring device, currently digitally as a rule, which is subsequently converted into an analog signal and amplified, which is used for driving an actuator which, in turn, excites a vehicle component into oscillations, at least locally, as a result of which the ultrasonic signal is emitted. The transmitted signal is generated in such a manner that it excites oscillations of the ultrasonic transducer only within a limited period of time. The transmitted signal comprises a pulse section in which, on transmission of the transmitted signal, the ultrasonic transducer is excited into generating ultrasound, and a constant section in which there is no excitation of the ultrasonic transducer. For a correlation with the received signal, it is thus only the pulse section of the transmitted signal which is of interest, that is to say that time interval of the transmitted signal which excites the ultrasonic transducer into oscillation and causes the transmitted ultrasonic signal to be radiated. To execute the cross-correlation, the converted received signal which corresponds to the converted echo signal is in each case multiplied by the transmitted signal shifted in time by an amount τ and integrated over a possible interval length T. In practice, this possible interval length is limited by the fact that the sensor, i.e. the environment monitoring device, emits transmitted signals iteratively. Considered differently, the measuring device generates a transmitted signal which iteratively comprises pulse sections. A maximally appropriate integration time is thus specified by such an iteration cycle time, i.e. the time between successive transmitted pulse sections. Depending on the amount of time delay ô of the signals, a correlation signal of the cross-correlation $$\Psi(\tau) = \frac{1}{2T} \int_{-T}^{T} s(t)e(t-\tau)\,dt,$$

is obtained, where s(t) represents the transmitted signal and e(t) represents the received signal.

In at least one illustrative embodiment, the transmitted pulse is generated in such a manner that the transmitted signal comprises a pulse section and a temporally invariable constant section, wherein the pulse section is derived from at least one time-limited section of a periodic oscillation signal or generated as periodic oscillation signal. The result of such an embodiment is that in the correlation, in each case only the sections of the received signal can contribute to the correlation result which are multiplied by the pulse section of the transmitted signal. The length of integration time can thus be adapted to the length of the pulse section in a suitable manner.

It can be shown mathematically that a signal-to-noise ratio can be improved up to a so-called Cramer Rao limit in that a sampling frequency with which the transmitted and received signal are digitized and/or a signal length of the pulse section of the transmitted signal are extended. Increasing the sampling frequency increases the requirement and thus the cost for the digitization electronics, whereas extending the pulse section of the transmitted signal leads to a spatial resolution, which can be achieved by means of the measurement, being reduced. Thus, a compromise with regard to a number of oscillations which are contained in the pulse section and an achievable signal/noise ratio must be weighed up here. An increased length of the pulse section of the transmitted signal as well as an increase in the sampling frequency additionally lead to an increased memory requirement in the evaluation device and thus have a negative effect on the system costs and system resources.

Although the selected correlation is suitable for suppressing statistical noise which is contained in the received signal or signal components which are within a frequency range deviating from the fundamental frequency contained in the pulse section, noise components coming from interference sources, the frequency of which is within the range of the frequency of the oscillations with which the ultrasonic transducer oscillates when transmitting the pulse section, are not suppressed, however. To provide for an isolation of such signals, it is provided in an illustrative embodiment that the signal generating device is constructed for deriving or generating a modulated periodic oscillation signal as transmitted signal. For this purpose, the signal generating device can comprise, for example, a modulation device. If the transmitted signal is generated digitally, it can also be stored, for example, in a memory and generate the modulated signal directly during the digital/analog conversion.

A particularly good suppression of interference signals is obtained when the modulation signal representing the modulation is a binary signal, especially a Barker or a Gold code or a pseudo-random number. The modulation signal is the signal which in information terms specifies the change of the oscillation in the pulse section.

The signal generating device may be constructed for carrying out a frequency modulation in which a change between at least two frequencies within the range of the natural frequency of the at least one ultrasonic transducer is effected during the generation of the pulse section in dependence on the modulation signal. The result is that non-binary signals can also be used as modulation signal so that the pulse section can have more than two frequency components in the range of the natural frequency of the ultrasonic transducer.

A further advantage of using a modulated oscillation signal in the pulse section of a transmitted signal consists in that an improved evaluation can be carried out in a motor vehicle, especially with the simultaneous use of a number of sensors which in each case emit a transmitted signal which differs from the transmitted signals of the other ultrasonic transducers. The correlation of the respective received signal converted from the echo signal with the corresponding associated transmitted signal leads to isolating the components which are caused by transmitted signals of other sensors.

An even more improved correlation evaluation is obtained in an illustrative embodiment in which the correlation uses that signal as transmitted signal which is derived from the oscillations of the ultrasonic transducer during the transmission of the transmitted signal. It has been found that the ultrasonic transmitted signal actually emitted differs slightly from the transmitted signal with which the ultrasonic transducer is driven. The reason for this is that the ultrasonic transducer, as a mechanical system, has an inertia as a result of which it displays a build-up and settling behavior. This is of significance particularly in the settling behavior since the latter is only moderately damped since an excitation must always take place within the range of the resonant frequency of the ultrasonic transducer in order to achieve as efficiently as possible an ultrasonic radiation. The correlation is thus improved due to the fact that this component, due to the build-up and settling, of the transmitted pulse, such as it is actually transmitted, is also taken into consideration. It should be noted at this point that due to the much lower amplitude with which the ultrasonic transducer is deflected during reception of the echo pulse, these effects are distinctly reduced for the received signal.

As a rule, the ultrasonic transducer which excites the vehicle component into oscillations at least locally in order to send the ultrasonic transmitted signal out into the environment is also used for receiving the reflected ultrasonic echo signal which excites the vehicle component into oscillations again. In this context, the fact is used that the transmitted signal has a pulse section of finite duration, which causes an active excitation of the ultrasonic transducer, and has a constant section which does not cause any active excitation of the ultrasonic transducer. Whereas the constant section of the transmitted signal controls the excitation of the ultrasonic transducer (which does not take place), the ultrasonic transducer can detect the oscillations of the vehicle component caused by the echo signal and convert them into the received signal. However, other embodiments can be provided to utilize a further ultrasonic transducer for receiving the echo signal. This, too, is concealed, that is to say either mounted integrally on the vehicle component on the side facing away from the environment or arranged integrally concealed on another vehicle component, also on the side facing away from the environment.

In FIG. 1, two illustrative embodiments are indicated diagrammatically to show how ultrasonic transducers 1 are integrated into the outer peripheral walls 2 of bumpers in the prior art. In both embodiment variants shown, a through opening 4 is produced in each case in the outer wall 2 of the bumper 3. This through opening 4 can be drilled, punched or formed in another way. In the upper example shown, a holder 6 is bonded or welded onto an inside 5 of the outer wall 2 of the bumper 3. The holder 6 also has a through opening 7 which is aligned centrally with the through opening 4 in the outer wall 2 of the bumper 3. Furthermore, the holder 6 has locking means 8 which are engaged by projections 9 of the ultrasonic transducer 1 in an installed state and lock the ultrasonic transducer 1 in the holder 6. Between the ultrasonic transducer 1 and the holder 6, a spacing and damping element 10 is inserted which is intended to produce a decoupling of the oscillations generated by the ultrasonic transducer 1 and the outer wall 2 of the bumper 3.

The second illustrative embodiment shown differs from the first embodiment only in that bumper locking means 11 are formed on the outer wall 2 of the bumper 3 which interact with counter elements 12 of the holder 6 when the holder 6 is locked on the inside 5 of the outer wall 2 of the bumper 3. In the case of the installation variants shown, the radiated ultrasonic signal is not impaired by the outer wall 2 either during transmission or during reception.

In FIG. 2, an illustrative embodiment of a bumper comprising an ultrasonic transducer is shown diagrammatically in which the ultrasonic transducer is installed concealed. In this case, the outer wall 2 of the bumper 3 does not have a breakthrough. A piezoceramic module 20, which serves as ultrasonic transducer, is applied on an inside 5 of an outer wall 2 of the bumper 3. In a part area 21 in which sound is radiated, ribbing 22 is bonded to the inside 5 of the outer wall 2 of the bumper 3. In this arrangement, the piezoceramic module 20 is arranged in a glued joint 23 between the ribbing 22 and the wall 2 of the bumper 3. This arrangement is described in greater detail, for example, in WO 2008/125260 A1.

In FIG. 3, an environment monitoring device is shown diagrammatically. An ultrasonic transducer 1 is arranged "behind" an outer wall 2 of a chassis part, for example of a bumper 3, with respect to an environment 31. The ultrasonic transducer is arranged integrally on the side of the wall 2 facing away from the environment 31. The outer wall 2 is not broken through in the area of the arrangement of the ultrasonic transducer 1 and has a closed surface 32.

A signal generating device 34 generates a transmitted signal 35. The transmitted signal comprises a pulse section 35a and a constant section 35b. The transmitted signal is converted via a digital/analog converter 36 and an amplifier 37 into a signal which drives the ultrasonic transducer 1 and causes the latter to oscillate so that the wall 2 is also caused to oscillate at least locally and an ultrasonic transmitted signal 38 is emitted. This is emitted into the environment 31 through the wall 2 and may there encounter an object 39 in the environment 31. The ultrasonic transmitted signal 38 is reflected back at the object 39 at least partially as echo signal 40 to the wall 2 and transmitted through the wall 2 to the ultrasonic transducer 1. The ultrasonic transducer 1 is thus caused to oscillate by the echo signal and converts the latter into an electric signal 41 which is converted via the A/D converter 42 into a now digital received signal 43.

In a correlation unit 44, a cross-correlation is calculated for different time delays τ between the transmitted signal 35 and the received signal 43. From this, a correlation signal 45 is produced which is plotted diagrammatically graphically with respect to the delay time τ. Corresponding to a delay time at which a correlation exceeds a correlation threshold value 46, i.e. a very good correspondence is found between the transmitted signal and the received signal, an object is detected in the environment 31. In this context, the time delay is a measure of the time which has elapsed between the emission of the transmitted pulse and the reception of the echo pulse so that it is possible to infer from this the distance of the object 39 from the motor vehicle 47 in which the ultrasonic transducer 1 or the environment monitoring device 30, respectively, is installed. The correlation signal 45 is evaluated in an evaluation unit 48. The correlation unit 42 is a component of the evaluation unit 46. The evaluation unit can carry out further evaluating steps, for example determine the distance and/or create an environment map or the like. The distances are obtained from the times at which the correlation signal has peaks, taking into consideration the speed of sound propagation of the ultrasonic transmitted signal and of the echo signal.

In the illustrative embodiment described, only one ultrasonic transducer is provided. Other embodiments can provide a number of ultrasonic transducers which are utilized at the same time or offset in time for emitting and receiving ultrasonic signals.

In order to suppress interfering signals, for example from other electronic components of the motor vehicle, it is provided in one illustrative embodiment that the signal generating device 34 creates a modulated transmitted signal which means that the pulse section of the transmitted signal has not only the oscillations of a frequency and uniform amplitude but the frequency and/or amplitude of the oscillations is varied in the pulse section. In this context, the expert naturally understands that this does not mean the build-up and settling behavior of the transmitted signal.

In yet another illustrative embodiment, the transmitted signal which is used for the correlation can be detected during the transmitting via the D/A converter so that the received transmitted signal corresponding to the transmitted ultrasonic signal actually emitted is correlated with the received signal which is derived from the echo signal.

Figure 4:
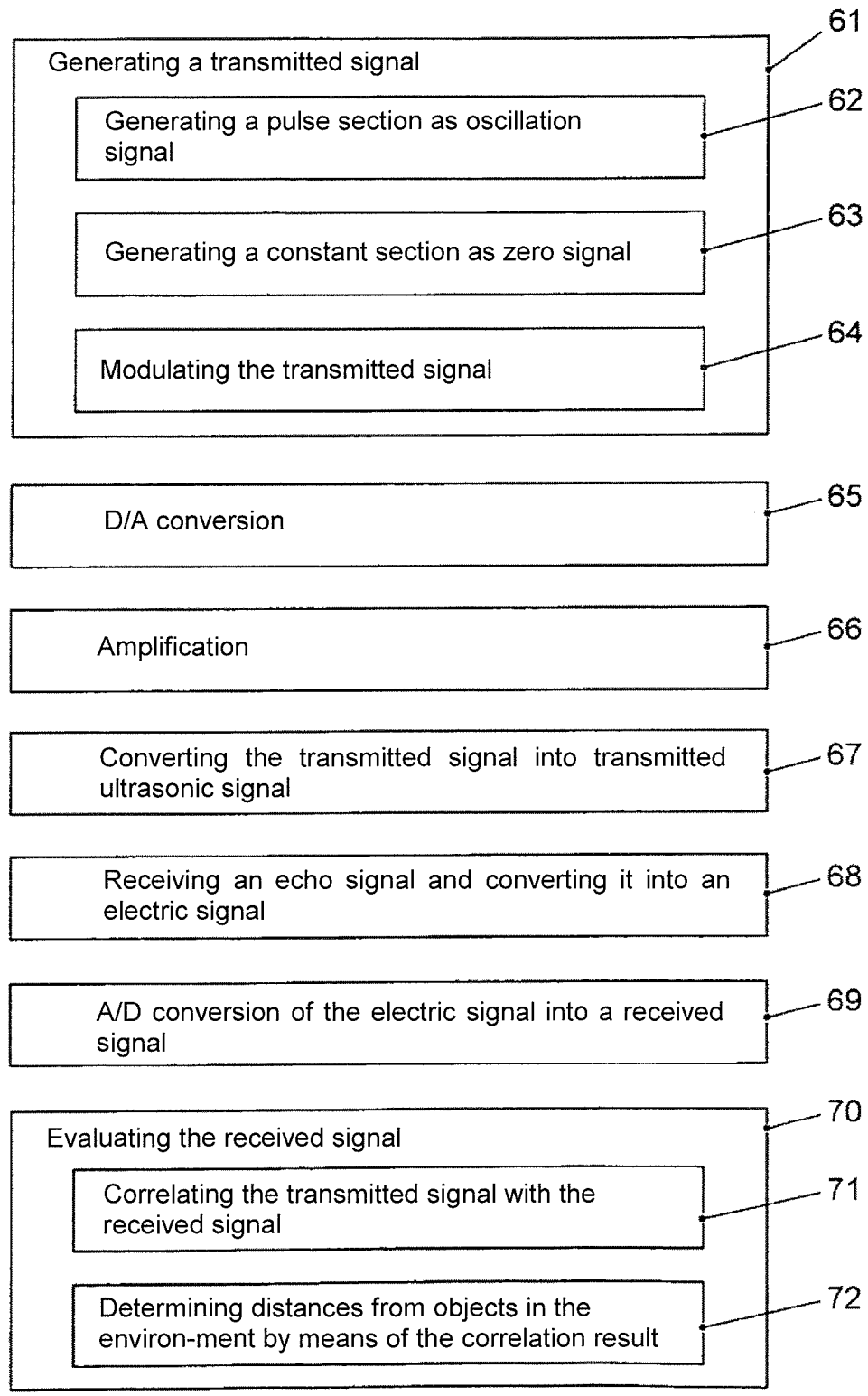
FIG. 4 shows a diagrammatic flow chart of a method for environment monitoring.

By means of FIG. 4, an exemplary method sequence of a measuring cycle is explained again diagrammatically. Initially, a transmitted signal is generated 61. This essentially comprises generating a pulse section in which the transmitted signal comprises a periodic oscillation. The remaining sections of the transmitted signal are generated as constant sections 63. In one illustrative embodiment, it is provided that the periodic oscillations which represent the pulse section of the transmitted signal are modulated 64, for example a frequency of the oscillations between different frequencies which are adjacent to the mechanical resonant frequency of the ultrasonic transducer via which the transmitted signal is to be converted into ultrasonic transmitted signals is varied. This variation may be carried out by means of a Barker code, Gold code or a pseudo random number which can be generated, for example, simply by means of feedback-type shift registers.

The transmitted signal is then converted from a digital signal into an analog signal 65 and amplified 66. Thereby, the ultrasonic transducer is driven and converts the transmitted signal into a transmitted ultrasonic signal 67. Subsequently, an echo signal is received 68 by means of the ultrasonic transducer and converted into an electric signal which is converted 69 into a received digital signal via an A/D converter. The received signal is subsequently evaluated 70. In this context, the transmitted signal and the received signal are correlated 71 for different time displacements T. In this context, the transmitted signal and the received signal are multiplied by one another and integrated over time. By means of the resultant correlation signal, distances to objects in the environment of the motor vehicle are subsequently determined 72 if such objects are present.

The advantage of the illustrative embodiments described lies in the fact that without a reconstruction of bumpers, ultrasonic transducers can be arranged on these and utilized which, nevertheless, provide for reliable environment monitoring. The by the attenuation which occur, for example, during the penetration of a bumper wall are compensated for by the fact that the signal/noise ratio is improved distinctly due to the correlation. The following applies to the filtered noise signal:

$$\sigma_{filtered\ noise\ signal} = \frac{\sigma_{noise\ signal}}{\sqrt{N}} = \frac{\sigma_{noise\ signal}}{\sqrt{\frac{f_{sample}}{f_{transmitted}} a_{number\ of\ oscillations}}} = \frac{\sigma_{noise\ signal}}{\sqrt{1024}} = \frac{\sigma_{noise\ signal}}{32}.$$

In this context, $f_{transmitted}$ is the transmitted frequency which is, for example, 50 kHz, and $f_{sample}$ is the sampling frequency with which digitization is performed which is, for example, 400 kHz. a specifies the number of oscillations in the pulse section and is determined to be 128, for example.

The noise signal can thus be reduced by a factor ⅟₃₂ by the correlation. In this context, a number of 128 oscillations at a transmitted frequency of 50 kHz represents a pulse length l:

$$l_{pulse} = \frac{c_0}{f} a_{number\ of\ oscillations} = 88\ cm,$$

which, at the same time, specifies the maximum resolution of the system. In practice, an optimization between the number of oscillations in the pulse section and a sampling frequency which can be implemented in costs which are still justifiable, must be selected in order to achieve as good a signal/noise ratio as possible.

Using Gold codes, Barker codes or pseudo random numbers for modulating the signal produces the advantage, on the one hand, that a maximum correlation interval between two transmitted signals which are modulated with different Barker codes, Gold codes or pseudo random numbers, is obtained during the evaluation. By this means, it becomes possible to transmit and evaluate different transmitted signals at the same time and thus to operate a number of ultrasonic transducers at the same time, which is currently not possible in the prior art. In addition, the modulation leads to interference sources being suppressed which occur in the frequency range in which the oscillations of the pulse section are located.

It is known from the prior art to monitor the environment of a motor vehicle by means of sensors and to evaluate the monitored sensor results in order to detect objects in the environment, in particular by determining one or more distances from objects in the environment and inferring from these the presence of objects. The results thus detected are used for different assistance systems. For example, the measurement results are utilized for outputting acoustic signals and/or optical signals to a driver of a road vehicle when the latter approaches an object in the environment of the vehicle, especially during parking. Every motor-driven land vehicle is considered to be a motor vehicle.

From the prior art, different sensors are known for carrying out environment monitoring. For monitoring within a near field of the vehicle which is of particular interest especially at low speeds, for example during parking, sensors are frequently used in the prior art by means of which a signal is emitted which is reflected from objects in the environment of the motor vehicle and the reflected signals are subsequently detected by the sensor. In this context, in one type of measuring sensors, the propagation time between the emission of a transmitted signal and the reception of a reflected transmitted signal, which is also called echo signal, is evaluated. If the speed of propagation of the signal is known, it is possible to draw conclusions from the propagation time with respect to the distances traveled by the transmitted signal and by the echo signal and thus the distance from a nearest object. If a number of sensors are used which are arranged spaced apart from one another on the motor vehicle, positions of the objects in the environment, sending back the echo pulses, can also be determined with the aid of triangulation methods.

A system for obstacle detection is known from EP 1 619 518 A1 in which a multiplicity of ultrasonic sensors which detect obstacles in the environment of the motor vehicle is installed both in the front and in the rear bumper of a vehicle.

The sensors are designed in such a manner that they can adapt both the frequency of the transmitted signal and a center frequency of a filter which filters the echo signal. This creates the possibility of operating different receiving microphones in the individual sensors which have different reception characteristics.

From DE 692 10 584 T2, an ultrasonic range-finding device for a mobile robot is known which has a transmitter for transmitting a ray with ultrasonic energy in a scanning manner over a target area of interest, a detector for selecting the reflected ultrasonic energy which comprises reflections of the transmitted ray from the target area, and a signal processor in order to amplify the signal detected by the detector, the processor having a correlation device with a reference signal in which the reference signal is a representation of the present signal which has been generated by the detector when the transmitted ray has been reflected by a plane reference target surface of interest in the case of a conventional incidence, the processor also comprising a computer memory for storing the signal representation and applying the latter as a reference signal to the correlation device during the detection of a signal which represents the reflection from a target or object to be detected. It is the aim of this method to avoid false range detections which are produced, for example, when the transmitted signal is reflected several times in a corner of a room.

For a detection which is as faultless as possible, it is desirable to obtain a high signal strength of the reflected signal. This leads to a good signal/noise ratio which is lastly responsible for the quality of detection. For this reason, ultrasonic sensors according to the prior art have usually been integrated in the bumper in such a manner that openings are inserted into an outer area of the bumper in which the transmitting and/or receiving sensors are inserted. The transmitting device and the receiving device are frequently integrated in a common ultrasonic transducer, the same oscillating element being used both for emitting the ultrasonic signal and for receiving the ultrasonic signal. From the prior art, ultrasonic transducers are known, for example, which use piezoelectric materials for converting electrical current into mechanical oscillation or the mechanical oscillation into electrical signals, respectively.

For aerodynamic and optical reasons, however, and for manufacturing considerations, it is desirable not to perforate the surfaces of the bumpers which nowadays are frequently painted in the same color as the remaining chassis parts of the motor vehicle. For this reason, sensors are also known from the prior art which are integrated in a manner not visible from the outside in chassis parts, particularly bumpers, of motor vehicles. These are arranged behind an external surface. One example of this is described in WO 2008/125260 A1.

In these systems, the ultrasonic signal is emitted into the environment of the motor vehicle through the outer surface, that is to say through a physically constructed component. The detection of the reflected ultrasonic signal is also effected again through the outermost wall of the chassis component. Naturally, this component induces attenuation both for the transmitted signal and for the echo signal. One possibility of counteracting this attenuation would consist in increasing the transmitted power and/or a sensitivity of the receiving device. Increasing the radiated transmitted power, i.e., improving the transmitting device, can be technically implemented but is associated with a not inconsiderable cost expenditure. Ultrasonic transducers produced in mass production which are also provided for non-covered use, i.e. insertion in a perforation in the outermost chassis or bumper wall, could not be used, so that the costs of an item for use in motor vehicles would rise considerably.

The illustrative embodiments provide for environment monitoring for ultrasonic sensors or ultrasonic transducers, respectively, installed in a concealed manner, without increasing the costs and a technical expenditure in the form of technical required components and the design thereof distinctly compared with systems which are used for environment monitoring solutions which are utilized with ultrasonic transmitting and/or receiving devices, installed in an unconcealed manner, in motor vehicles.

The expert will understand that only exemplary embodiments are described here. The features described can be used in any combination for implementing the invention.

LIST OF REFERENCE DESIGNATIONS

1 Ultrasonic transducer
2 Wall
3 Bumper
4 Through opening
5 Inside
6 Holder
7 Through opening
8 Locking means
9 Projections
10 Spacing and damping element
11 Bumper locking means
12 Counter element
20 Piezoceramic module
21 Part area
22 Ribbing
23 Glued joint
30 Environment monitoring device
31 Environment
32 Surface
34 Signal generating device
35 Transmitted signal
35a Pulse section (of the transmitted signal)
35b Constant section (of the transmitted signal)
36 D/A converter
37 Amplifier
38 Transmitted ultrasonic signal
39 Object
40 Echo signal
41 Electric (converted echo) signal
42 A/D converter
43 Received signal
44 Correlation unit
45 Correlation signal
46 Correlation threshold value
47 Motor vehicle
48 Evaluating unit
61-72 Method steps

The invention claimed is:

1. An environment monitoring device in a motor vehicle, comprising:
a signal generating device for generating a transmitted signal;
at least one ultrasonic transducer for converting electric oscillations into acoustic oscillations and/or vice versa;
an evaluating device which evaluates a received signal to determine one or more distances from objects in an environment of the motor vehicle, wherein the signal generating device is linked to the at least one ultrasonic transducer so that the ultrasonic transducer radiates a transmitted ultrasonic signal into the environment in accordance with the electric transmitted signal and the evaluating device is connected to the at least one ultrasonic transducer or at least one further ultrasonic transducer which in each case convert a received echo signal into a received signal for the evaluating device,
wherein the at least one ultrasonic transducer and the at least one further ultrasonic transducer are in each case arranged integrally on a side, facing away from the environment to be monitored of the motor vehicle, of a wall of a bumper, and the emission of the transmitted ultrasonic signal into the environment and the reception of the echo signal from the environment in each case takes place by locally causing the respective vehicle component to oscillate and the evaluating unit comprises a correlation unit which forms a cross-correlation of the transmitted signal with the received signal and is also constructed to determine the one or more distances from the object in the environment by the correlation signal calculated by the correlation function during the correlation, and
wherein the transmitted signal comprises a pulse section and a temporally invariable constant section and the signal generating device is constructed for deriving the pulse section from a time-limited section of a periodic oscillation signal.

2. The environment monitoring device of claim 1, wherein the signal generating device comprises a modulation device which modulates the period oscillation signal to generate a modulated transmitted signal.

3. The environment monitoring device of claim 2, wherein a binary signal is used as modulation signal.

4. The environment monitoring device of claim 2, wherein the modulation device is constructed for carrying out a frequency modulation in which a change between at least two frequencies within the range of the natural frequency of the at least one ultrasonic transducer is effected for generating the pulse section in dependence on the modulation signal.

5. A method for environment monitoring in a motor vehicle, comprising:
generating a transmitted electric signal;
converting the transmitted electric signal into a transmitted ultrasonic signal;
converting a received ultrasonic echo signal into a received signal; and
evaluating the received signal for determining one or more distances from objects in the environment of the motor vehicle,
wherein a vehicle component is excited locally into oscillations on a side facing away from the environment to be monitored by an ultrasonic transducer arranged integrally on the side facing away to emit the transmitted ultrasonic signal into the environment by the vehicle component which has a closed surface, facing the environment, formed without penetrations in the area of the arrangement of the at least one ultrasonic transducer, and the reflected ultrasonic echo signal which causes the vehicle component or another vehicle component to oscillate at least locally by the at least one ultrasonic transducer or by another further ultrasonic transducer arranged integrally on the side of the vehicle component facing away from the environment or on the side of the other vehicle component facing away from the environment is received and converted into the received signal, wherein during the evaluating, a cross-correlation is formed between the received signal and the transmitted signal and in this context a correlation signal is calculated and the one or the several distances from the objects are determined by the correlation signal, and
wherein the transmitted signal is formed from a pulse section and a temporally invariable constant section, wherein the pulse section is derived from at least one time-limited section of a periodic oscillation signal or is generated as such a one.

6. The method of claim 5, wherein the transmitted signal is modulated.

7. The method of claim 6, wherein a frequency modulation is carried out in which a change of the frequency between at least two frequencies in the range of the natural frequency of the at least one ultrasonic transducer is effected in dependence on a modulation signal to generate the pulse section of the transmitted signal.

8. The method of claim 5, wherein the signal which is derived from the oscillation signal of the ultrasonic transducer during the transmission of the pulse section of the transmitted signal is used as transmitted signal for the correlation.

9. The environment monitoring device of claim 3, wherein the modulation signal represents a Barker code, a Gold code or a pseudo random number.

10. The method of claim 5, wherein the vehicle component is a wall of a bumper.

11. The method of claim 7, wherein the modulation signal represents a Barker code, a Gold code or a pseudo random number.

* * * * *